Jan. 20, 1953

ALEXANDER LISSIANSKY
NOW BY CHANGE OF NAME
ALEXANDER LISSANCE
PHONOGRAPH RECORD DEMONSTRATOR 2,626,158

Filed July 3, 1948

5 Sheets-Sheet 1

INVENTOR.
ALEXANDER LISSIANSKY NOW BY CHANGE OF NAME ALEXANDER LISSANCE
BY
Leon M. Straus
Att.

Jan. 20, 1953

ALEXANDER LISSIANSKY
NOW BY CHANGE OF NAME
ALEXANDER LISSANCE
PHONOGRAPH RECORD DEMONSTRATOR 2,626,158

Filed July 3, 1948

5 Sheets-Sheet 2

INVENTOR.
ALEXANDER LISSIANSKY NOW BY
CHANGE OF NAME ALEXANDER LISSANCE
BY Leon M. Strauss
AGT.

Jan. 20, 1953

ALEXANDER LISSIANSKY
NOW BY CHANGE OF NAME
ALEXANDER LISSANCE
PHONOGRAPH RECORD DEMONSTRATOR 2,626,158

Filed July 3, 1948

5 Sheets-Sheet 3

INVENTOR.
ALEXANDER LISSIANSKY NOW BY CHANGE OF NAME ALEXANDER LISSANCE
BY
Leon M. Strauss
Att.

Jan. 20, 1953

ALEXANDER LISSIANSKY
NOW BY CHANGE OF NAME
ALEXANDER LISSANCE 2,626,158

PHONOGRAPH RECORD DEMONSTRATOR

Filed July 3, 1948

5 Sheets-Sheet 4

INVENTOR.
ALEXANDER LISSIANSKY NOW BY
CHANGE OF NAME ALEXANDER LISSANCE
BY
Geo. W. Strauss
Att.

Jan. 20, 1953

ALEXANDER LISSIANSKY
NOW BY CHANGE OF NAME
ALEXANDER LISSANCE
PHONOGRAPH RECORD DEMONSTRATOR 2,626,158

Filed July 3, 1948

5 Sheets-Sheet 5

INVENTOR.
ALEXANDER LISSIANSKY NOW BY
CHANGE OF NAME ALEXANDER LISSANCE
BY Leon M. Strauss
Att.

Patented Jan. 20, 1953

2,626,158

UNITED STATES PATENT OFFICE 2,626,158

PHONOGRAPH RECORD DEMONSTRATOR

Alexander Lissiansky, New York, N. Y., now by change of name Alexander Lissance

Application July 3, 1948, Serial No. 36,887

8 Claims. (Cl. 274—14)

This invention relates to tone reproducing apparatus and more particularly to a machine for playing various sizes of records.

It is one of the objects of this invention to provide means facilitating playing of records of predetermined size in any desired sequence and to any desired extent (such as ¼, ½, ¾ etc. of a record or records).

It is another object of this invention to provide means rendering a preset period of time for playing record or records possible without regard to the size of the record or records used.

It is still a further object of the invention to provide means automatically regulating the driving and adjusting mechanisms of record playing machines as to starting as well as finishing positions.

Yet a further object of the present invention is to provide means permitting automatic playing of records without operating the pick-up or tone arm by the hand of an operator and provide further means guiding the tone reproducing needle from below the record in engagement and disengagement positions therewith, whereby neither the needle nor the pick-up arm are exposed or accessible for manipulation by the operator.

Still another object of the invention is the provision of means permitting automatic start of the tone reproducing apparatus upon placing a record on the turn table thereof and causing automatic withdrawal of the needle carried by the tone or pick-up arm from said record upon removal of the latter from the apparatus.

Still a further object of the invention is to provide means affording automatic separation of the driving mechanism from the cam or control mechanism of the apparatus upon engagement of the needle with the record grooves and/or upon termination of the needle operation, whereas any overrun of the mechanism is effectively avoided and the employment of any brakes will become unnecessary.

Another object of the invention resides in the provision of means offering the possibility of constructing a portable apparatus which may also be used in record stores and other commercial establishments for playing or trying out any record discs, for example by an interested purchaser without being able in any way to damage the record discs or the needle of the apparatus.

Still another object of the invention is to provide means ensuring substantially instantaneous stop of the apparatus, avoiding transfer of inertia from the motor to the driven parts of the apparatus and reducing the weight of these parts to an extent that economical, efficient and uniform operation of the apparatus will always be achieved.

A still further object of the invention is to provide means enabling a very simple and inexpensive construction of a phonograph record demonstrating apparatus, which is sturdy, withstands considerable wear, and is substantially foolproof, so that any injury or damage of phonograph records, needle and other vital parts of the apparatus will practically be impossible.

These and other objects of the invention will be pointed out in the following description and claims and illustrated in the accompanying drawings which disclose, by way of example, the principle of the invention and preferred modes which have been contemplated for applying said principle.

Figure 1:
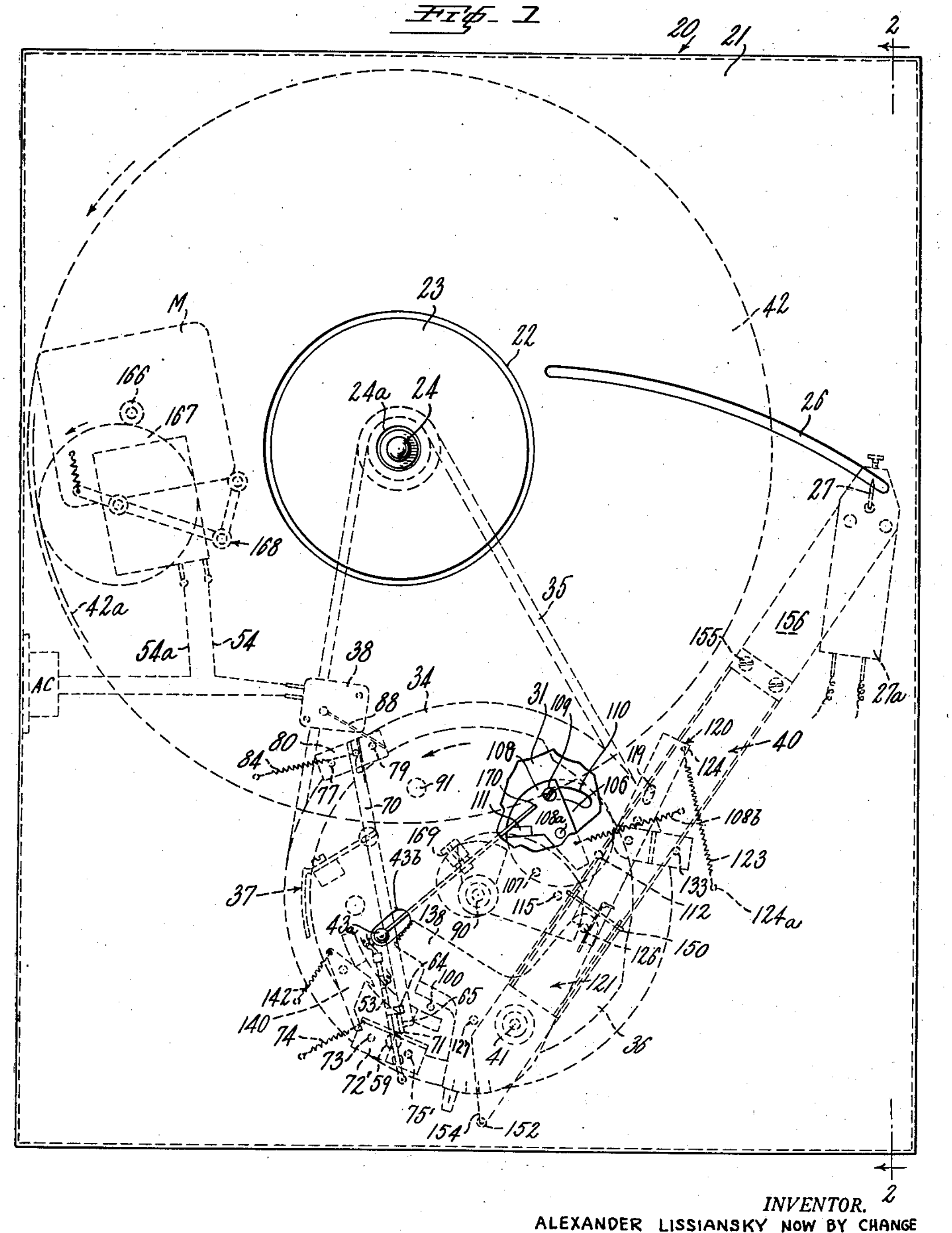
Fig. 1 is a top plan view of the phonograph record reproducing or demonstrating apparatus as seen from the top plate and with parts thereof broken away.

Referring now more particularly to the drawings, there is shown in Fig. 1 the phonograph record reproducing apparatus 20 with cover 21, which has an opening 22 through which extend the platform 23 and center pin 24 for receiving and centering a conventional record disc 25, which frictionally engages platform 23, the latter being rotated by a drive from motor M, as will be later described.

Top or cover 21 is further provided with an arcuate slot 26 through and along which the phonograph needle 27 may move to operative and inoperative positions.

The apparatus 20 has further a base 28 to which is fastened at 29 the housing or casing 30 which is closed by an upper chassis plate 31. Chassis plate 31 and cover 21 are removably attached to the upper, recessed rim of casing 30 by means of screw bolts 32.

Chassis plate 31 carries at its underface the driving mechanism 33 with pulley 34 and transmission element 35 and further the cam plate mechanism or control means 36 including the coupling device 37 of the latter. Accommodated in housing 30 is motor M, motor switch 38 and relay switch 39, as well as lift pin 41 for controlling pick-up arm 40 of the apparatus. Pick-up arm 40 is journalled and supported on the upper surface of chassis plate 31 and is adapted for movement below cover 21 and relatively to its slot 26.

Between cover 21 and chassis plate 31 there is disposed a turn table 42 which is attached to platform 23 in any appropriate manner. Further affixed to the upper surface of chassis plate 31 is a selector finger 43 which is adapted for actuation if the apparatus is used for playing or trying out 12″ records instead of 10″ records, as will be later on described.

The apparatus 20 just outlined is constructed in such a manner that it fulfills practical requirements and purposes and can be used for tone reproducing of a conventional 10″ record as well as of a conventional 12″ record disc which is to be operated to play for the full extent of the recording, for a preset portion thereof, or the record disc may be removed from the platform of the apparatus by the operator at any desired lapse of time determined by the start and finish of the playing of the record disc. In all these operations it will become necessary that the apparatus is reset to starting or "zero" position, whereby the needle of the apparatus is enabled to play again a record disc within the shortest period of time.

Figure 5:
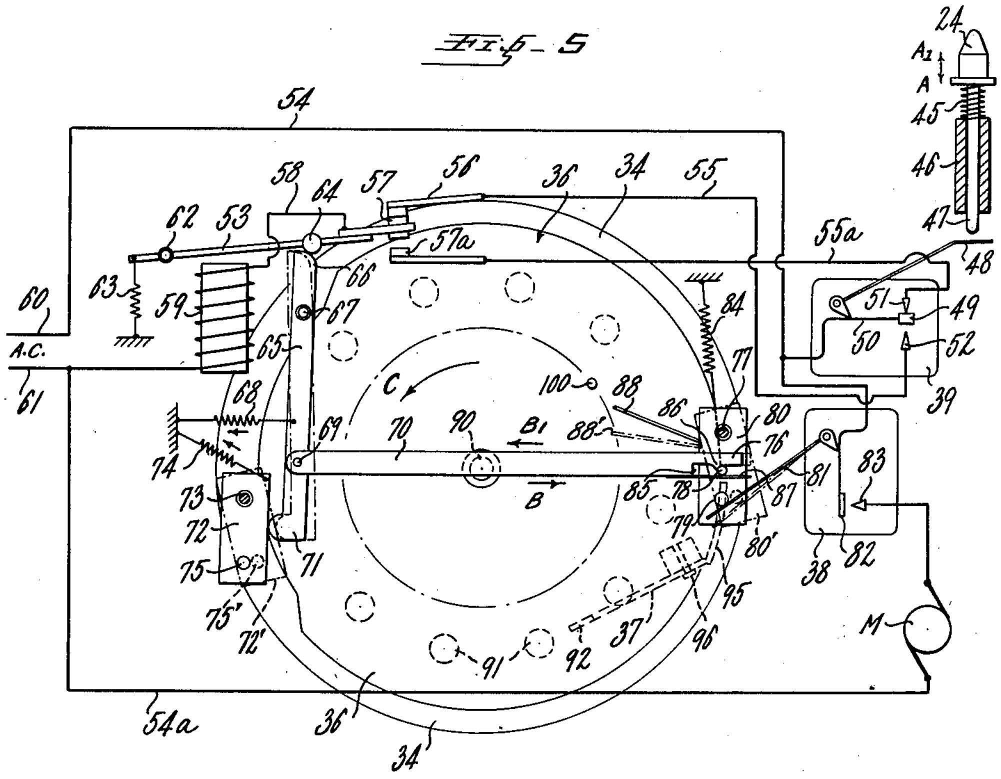
Fig. 5 shows diagrammatically the wiring and the switching arrangement of the apparatus.

In order to more fully explain the aforesaid purposes, reference is first made to Fig. 5 which shows diagrammatically the function of the main parts of the apparatus.

Upon placing a record disc 25 (Figs. 2 and 3) on the center pin 24, the same is moved in the direction A and against pressure of spring 45 lengthwise of guide sleeve 46 until the lowermost end 47 of said pin abuts against relay switch arm 48 which causes displacement of contact arm 50, the latter normally closing contact 49 and contact 51. Due to this displacement, contact shoe 49 will make contact with contact shoe 52, whereby the following electric circuit is established: Leg 60 of power line AC, conductor 54, contact arm 50, contact shoe 49, contact shoe 52, conductor 55, contacts 56, 57, conductor 58, relay 59 (which is magnetically latched) and leg 61 of power line AC.

Energization of relay 59 causes armature 53 to be attracted, the latter moving about pivot 62 against the action of spring 63. Movement of armature causes rod 64 carried by the latter to engage the cam-shaped end 66 of link bar 65 whereby a swinging movement of said link bar 65 is performed about pivot 67 and against the action of spring 68. As a consequence thereof, pusher bar 70 is driven in the direction of arrow B, since said bar is pivotally connected at 69 to link bar 65. Link bar 65 is further provided with a cam-shaped end piece 71 which is adapted to abut against a link 72 which, in turn, is pivotally supported on a pin 73 from the chassis plate 31. Link 72 carries a pin or like element 75 adapted for cooperation with the aforesaid coupling device 37 (Fig. 6) and is normally held by suitable spring means 74 in abutting relation with cam end 71, as shown in full lines. As soon as pusher bar 70 is displaced, link 72 assumes a position 72′ seen in dot-dash lines with pin 75 in a position 75′.

Pusher bar 70 has a forward end 76 provided with a nose or spur 86 which is adapted to cooperate through abutment pin 78 with link 80 in such a manner that the latter is swung about its pivot 77 (fixed to the chassis plate 31) to the dotted line position 80′. A further pin 79 is carried by the free end of link 80 and is adapted to coact with a lever 81 of the motor micro switch 38. Pin 79 is also adapted to cooperate with the coupling device 37 (Fig. 6), as will be later described.

Link 80 is normally held in a position shown in full lines and on account of the displacement of pusher bar 70 (in the direction of arrow B) is swung about pivot 77 to position 80′ whereby pusher pin 79 acts against lever 81 and brings about closing of contacts 82 and 83 of motor switch 38 which causes motor M to be included in the power line AC for starting said motor.

In order to retain lever 81 in its position 81′, a spring 84 is employed which performs a toggle action and holds link 80 in the dot-dash line position 80′. Link 80 is further prevented from return to its full line-position by the engagement of pin 78 with nose 86 provided at the forward end 76 of pusher bar 70. A recess 85 is provided rearwardly of nose 86 and is defined at the opposite side of the latter by a light leaf spring 87 carried by bar 70 and for a purpose later referred to.

It will be realized from the aforesaid disclosure that upon actuation of link bar 65 at 64 and 66, flow of electric current between contact pieces 56 and 57 will be interrupted, whereas contact will be established between contact pieces 57 and 57*a*, conductor 55*a* connecting now the latter contact with contact shoe 51 at which the circuit is interrupted, as long as the record disc engages center pin 24 as aforesaid.

Motor M, as is well understood, rotates through transmission element 35 pulley 34 which is journalled on axle 90, the latter being anchored on chassis plate 31, whereby pulley 34 is driven in a direction indicated by arrow C.

Figures 6, 7:
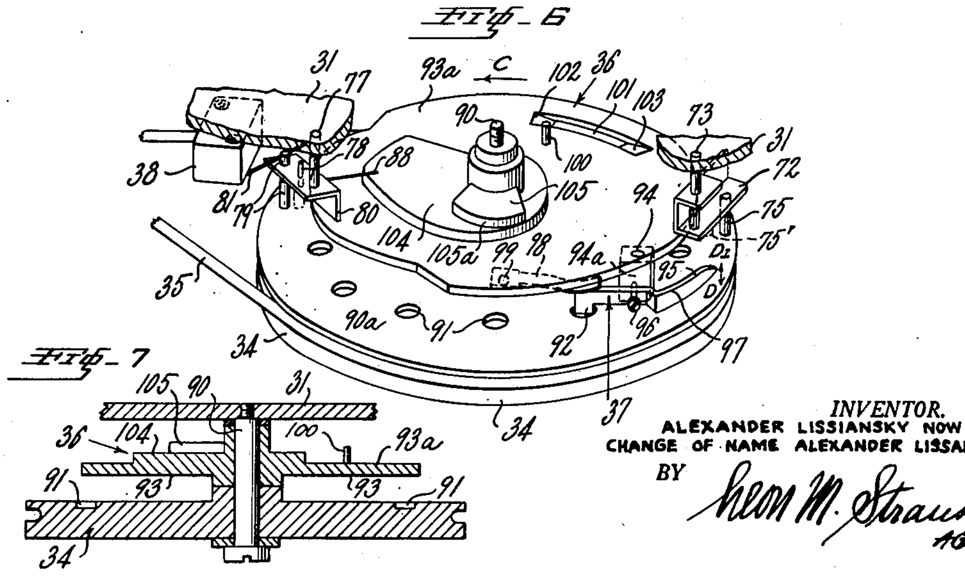
Fig. 6 is a perspective view of the cam or control mechanism with clutch employed in this invention.
Fig. 7 is a vertical section through the cam mechanism of Fig. 6.

Upper surface 90*a* of pulley 34 is provided with a predetermined number of recesses 91, spaced from each other and adapted for engagement with a pawl 92 forming part of the coupling device 37. This coupling device is secured to the underface 93 of cam plate or wheel 36 at 94 and extends between said cam plate and said pulley. A screw bolt 96 pivotally anchors pawl 92 and projecting slide member 95 on a holder 94*a*, whereby member 95 may reciprocably move in the direction of arrows D and D1. Slide member 95 has an upper, somewhat curved engaging surface 97 adapted for cooperation with pin 75 of link 72 and pin 79 of link 80 (Figs. 5 to 7). Further affixed at 99 to underface 93 of cam plate 36 is a leaf spring 98 which acts on pawl 92 to press the latter into any of the selected recesses 91, as will be later explained.

Figures 2, 3, 4:
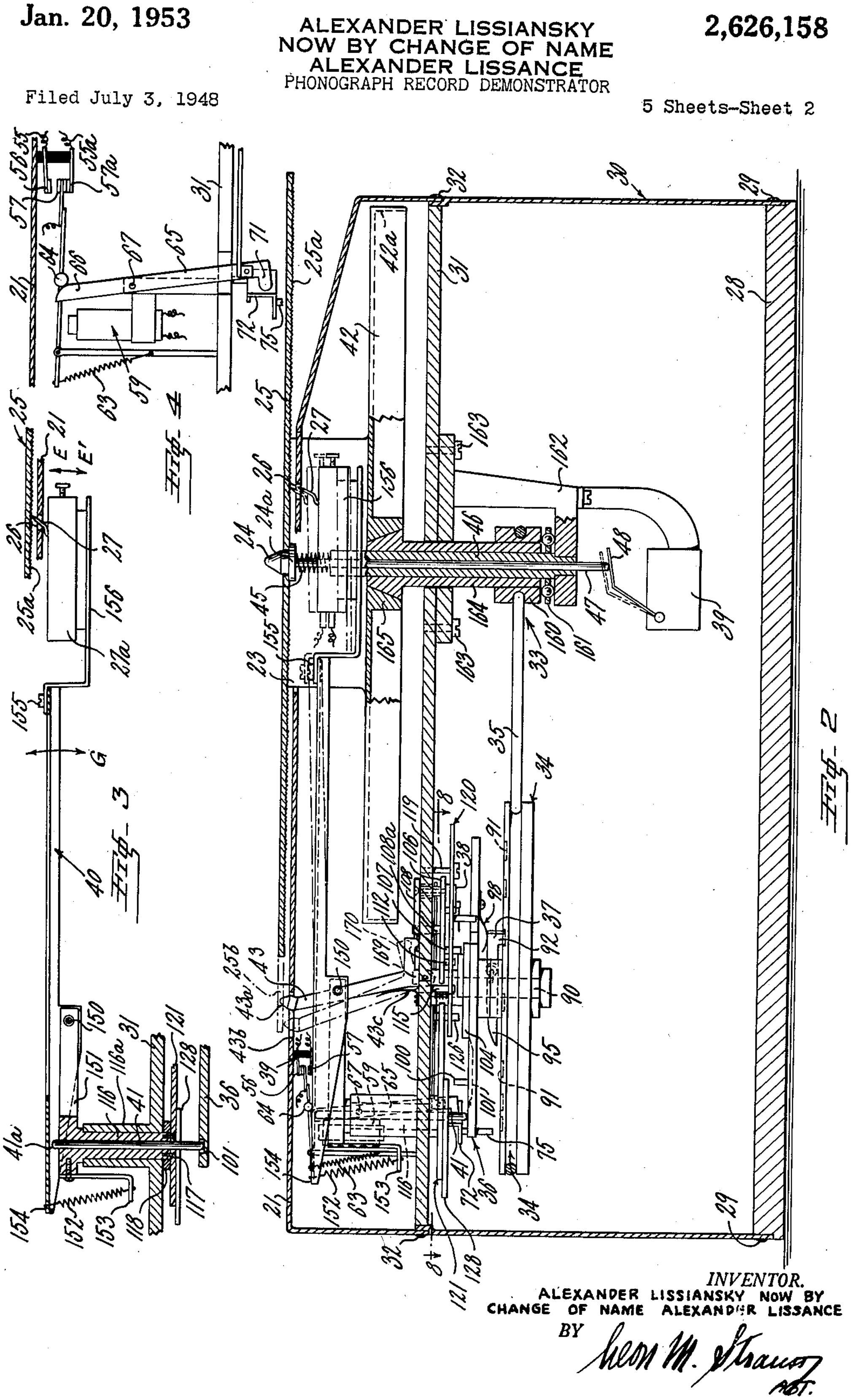
Fig. 2 is a sectional view of the apparatus taken generally along line 2—2 of Fig. 1, parts thereof being broken away.
Fig. 3 is a sectional view of the support of the pick-up arm shown in record playing position.
Fig. 4 is a detail view of a switch arrangement employed in this invention.

The upper surface 93*a* of cam plate 36 carries a reset pin 100 and an elongated groove 101 having the sloping end shoulders 102 and 103. Reset pin 100, as will become clear from Fig. 5, is disposed in the path of lever 88 (when the latter assumes its displaced position indicated by numeral 88′). Elongated groove 101, as may be realized from Figs. 2 and 3, is arranged in the path of lift pin 41.

During rotation of pulley 34 (and as long as motor M is switched on), links 80 and 72 are maintained in their respective positions 80′ and 72′. As a consequence thereof, pin 79 is out of the range of coupling member 95 which is free to swing in the direction of arrow D1 and to permit engagement of pawl 92 with one of the recesses 91 of the pulley 34.

Thus, pulley 34 and cam plate 36 are rotated in unison until member 95 arrives at and engages with its surface 97 pin 75 (which assumes its position 75′), whereby pawl 92 due to the movement of member 95 in the direction of arrow D is withdrawn from recess 91 and pulley 34 is allowed to further rotate while cam plate 36 is stopped. During this stage of rotation of pulley 34, the tone reproduction of the record disc takes place.

As will be later on explained in detail, upon termination of the tone reproduction of the record disc, it will become necessary to switch off motor M. This is effectuated by moving link 80 and pin 79 from the dot-dash line positions 80′, 79′ back to full line positions, whereby springy micro-switch arm 81 is forced from position 81′ to its initial or full line position and thus brings about separation of contacts 82, 83.

In the event that it will be desired to remove or lift the record disc from center pin 24 before the tone reproduction is finished (for example, when trying out a record disc and playing only a part of it), disengagement of pin 47 from lever 48 will occur, thus bringing contacts 49 and 51 again into engagement with each other, whereby a circuit is closed passing through leg 60, conductors 54, 50 and 55*a*, contact shoes 57*a*, 57 (which are still engaged due to the magnetic retentiveness of core of relay 59), conductor 58 back to leg 61, whereby, however, a reversal of current flow through relay 59 takes place which causes relay de-magnetization and return of armature 53 to its starting position (Fig. 5) in which current flow through conductor 55*a* is interrupted between 57 and 57*a*.

Link bar 65 assumes then again its full line-position in which contact shoes 56 and 57 are reset for contact with each other. Simultaneously, pusher bar 70 is retracted in the direction of arrow B1. Return of link pin 78 in position against nose 86 and swinging of link 80 from its position 80′ to full line-position is subsequently effectuated when reset pin 100 strikes lever 88 (while still in position 88′) whereby lever 81 with pin 79 are moved back from outward position 81′ and 79′ to full line-position (Fig. 5) and thus cause interruption of contacts 82, 83 of the motor switch 38, whereby the motor drive comes to a stop.

As can be seen from Fig. 6 within the space between chassis plate 31 and cam plate 36, there are positioned besides the aforesaid links 72 and 80 a spiral-shaped pick-up cam member 104 and a selector cam 105, the latter being placed on top of the cam member 104, whereas said cam member 104 is affixed to the upper surface 93*a* of cam plate 36.

Further depending from and supported by chassis plate 31 is a selector disc 106 which carries at its underface a pin 107, which is adapted to engage the cam periphery 105*a* of selector cam 105 in predetermined position of the latter. Movably connected to selector disc 106 is a V-shaped element 108, which is positioned on the top surface of chassis plate 31 and is joined to said selector disc 106 by means of a screw bolt 109 passing through a suitably shaped slot 110 provided in the chassis plate 31.

The V-shaped element 108 has a forwardly sloping abutment piece 111 against which the forward end of selector finger 43 comes to rest, in the event that a 10″ record disc is used (Figs. 8 to 11), but over which said forward end of selector finger 43 rides to extend over the surface of V-shaped element 108, in the event that a 12″ record disc is to be operated (Fig. 1).

V-shaped element 108 is swingable about pivot 108*a* and is held in normal position by means of a spring 108*b*. Selector disc 106 carries at its underface a stop pin 112, which is employed when the apparatus is to play 12″ record discs (Fig. 1), as will be later explained.

A further stop pin 115 extends from the underface of chassis plate 31 to limit the movement of release lever 120 which is adapted to cooperate with a pick-up lever 121 whose operation is about to be described.

Release lever 120 and pick-up lever 121 are also positioned between chassis plate 31 and pick-up cam 104 (Fig. 2). Pick-up lever 121 is supported for pivotal movement by a sleeve member 116 through which passes lift pin 41. Sleeve member 116 forms also a support for the pick-up arm 40 and carries the aforesaid pick-up lever 121 underneath chassis plate 31 by means of screws 117 and washer 118 (Fig. 3).

Release lever 120 is held in position by means of a suitable stud 119 which is anchored on the chassis plate 31, said lever 120 being adapted to move lengthwise of its slot 122 which engages stud 119.

Release lever 120 is further under action of spring 123 which extends between one extremity 124 of said release lever and an anchoring pin 124*a* fixed to chassis plate 31.

Figure 8:
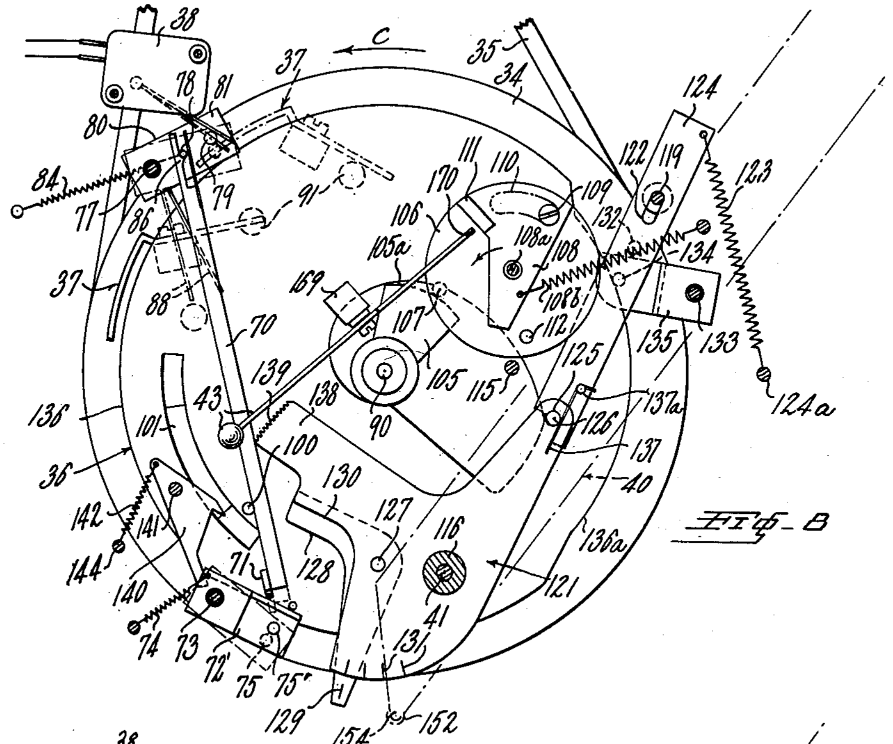
Figs. 8, 9, 10 and 11 show the cam mechanism and the parts controlled thereby in various positions and seen generally along line 8—8 of Fig. 2, the chassis plate of the apparatus being omitted for clarity's sake.
Figure 9:
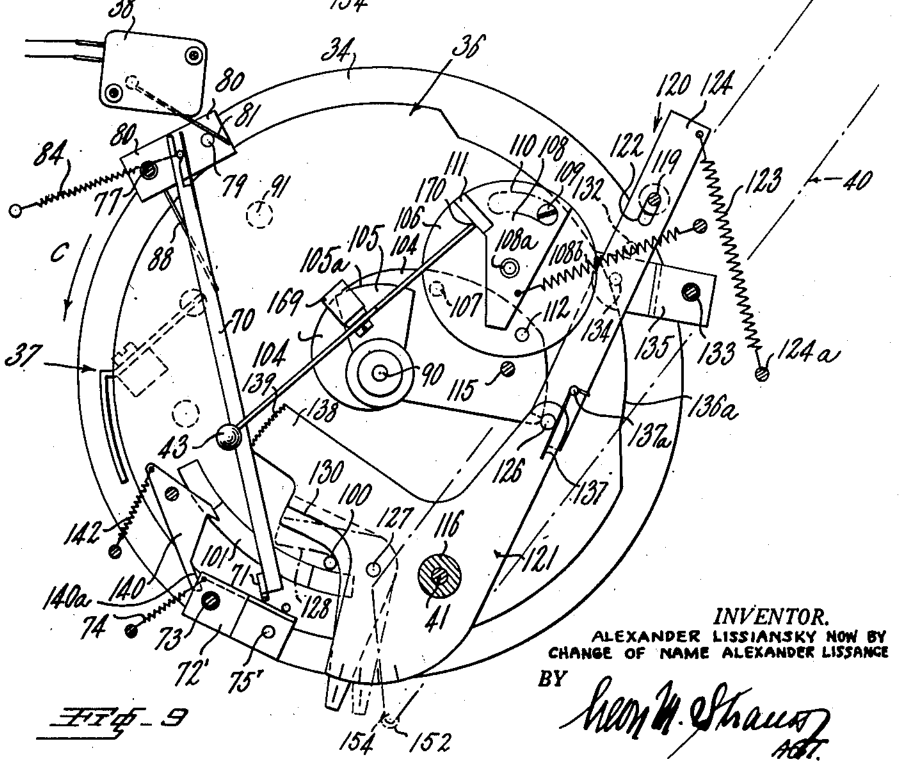
Figure 10:
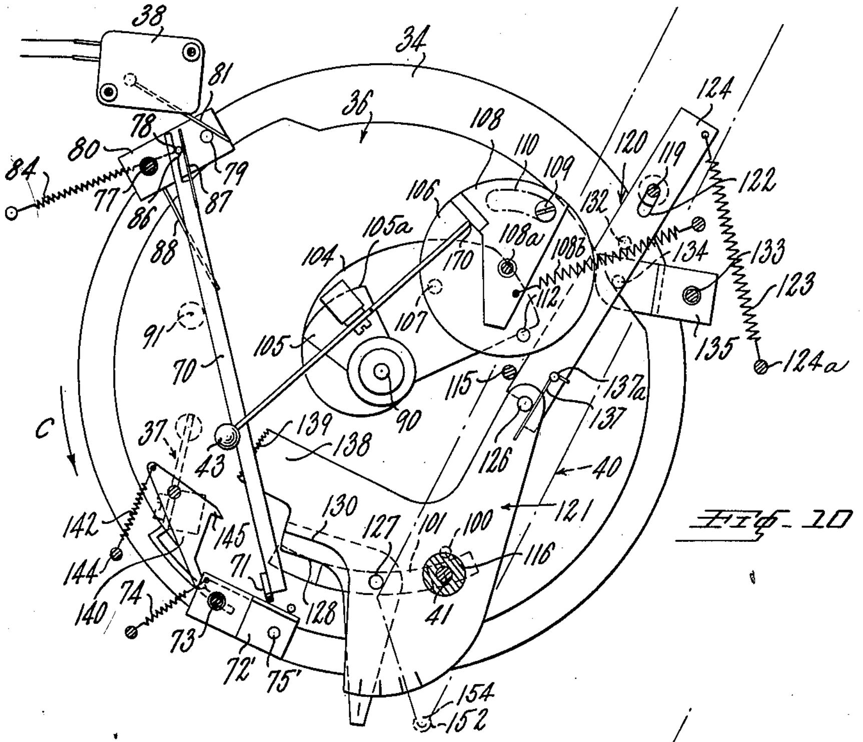

The opposite extremity of lever 120 is provided with a notch 125 for the engagement with a pin 126 attached to the pick-up lever 121 (Figs. 8 to 10). Pick-up lever 121 is further provided with a fixed edge 130 to which is relatively movable a heel or projection 128 which is rotatably and frictionally held by means of a tight rivet 127 on lever 121. Thus, heel 128 may be swung about said rivet to relatively adjust said heel piece 128 to said pick-up lever 121. Markings or suitable graduations 131 are provided at one end of said lever 121 with which handle 129 cooperates, whereby swinging movement of handle 129 relatively to said markings brings about displacement of heel 128 to a position, say, 128′ (Fig. 11) with respect to fixed edge 130 of said pick-up lever 121. Thus, heel 128 is enabled when suitably displaced to abut against and actuate link 72 while the latter is in position 72′, as will be later referred to.

Release lever 120 carries on its surface a stop pin 132 for the abutment of release link 135 which is pivotally supported at 133 on chassis plate 31. To the free end of release link 135 there is affixed a guide pin 134 adapted to engage the peripheral cam surfaces 136 (projecting part) and 136*a* (recessed part) of cam plate 36.

Adjacent notch 125, there extends a wire spring 137 which is anchored on stud 137*a*, the latter being carried by release lever 120.

Pick-up lever 121 has an extension 138 with peripheral teeth 139 for the engagement with a pawl 140 which is pivoted about pin 141 and held under the action of a spring 142 which extends between end 143 of pawl 140 and a stud 144 supported by chassis plate 31.

Figure 11:
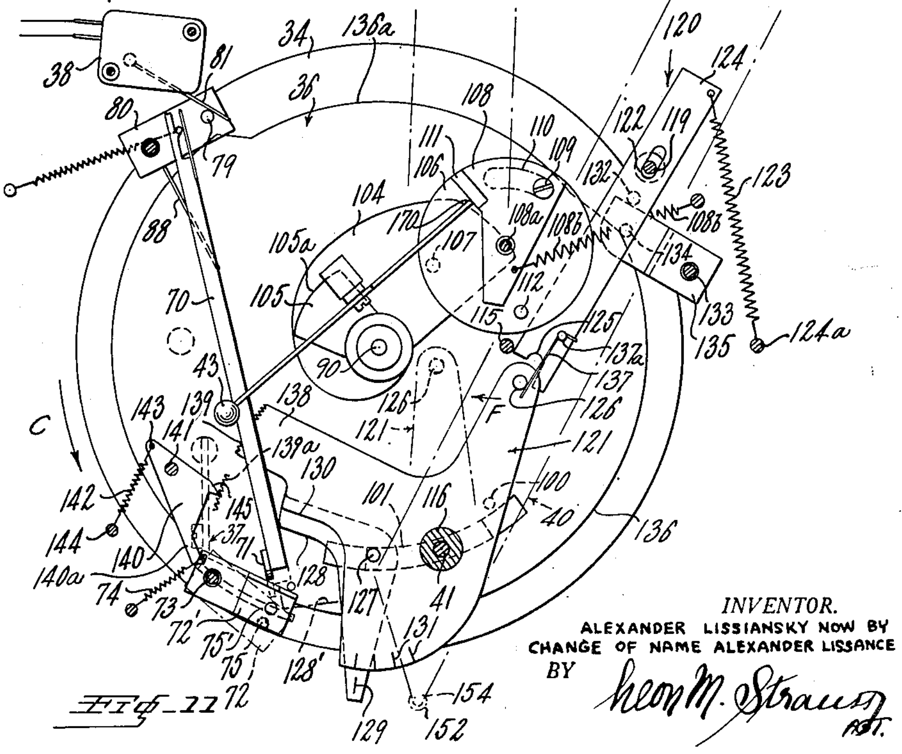

Pawl 140 is provided with a projecting tooth 145 adapted to coact with one of the peripheral teeth 139 of extension 138 as indicated in dotted position 138*a* of said extension (Fig. 11).

In Fig. 3 the support for the pick-up arm 40 is shown in greater detail from which it becomes clear that arm 40 may swing in upward and downward directions E, E' about pivot 150 which is carried by a bracket 151 on which is anchored at 153 a spring 152, the latter being connected to the extremity 154 of the pick-up arm 40. At the opposite extremity 155 of pick-up arm 40, there is attached a holder 156 for the pick-up cartridge 27*a* and needle 27, the latter passing when in operative position through slot 26 of cover 21 to play the underside 25*a* of record disc 25.

Vertical movements of needle 27 in the directions E, E' are controlled by groove 101 of cam plate 36 and lift pin 41. Upper end 41*a* of lift pin 41 is adapted to abut against the underface of pick-up arm 40 whereby pivotal movement of pick-up arm 40 against the action of spring 152 about fulcrum 150 may be effectuated.

Horizontal movements of needle 27 in the direction of slot 26 are transmitted by sleeve 116 from pick-up lever 121 when the latter is freed upon disengagement thereof from release lever 120, as referred to hereinbelow.

Assuming now that the tone reproduction of a record disc is to be performed to the full extent of its recording, and further assuming that a 10'' record disc is used, it will become apparent that such disc 25 must be first placed on center pin 24 for engagement with platform 23. Extension pin 47 recedes then within guide sleeve 46 and causes by means of relay switch arm 48 establishment of an electric circuit passing through contact shoes 49, 52 of relay switch 39 and contacts 56, 57, as hereinabove mentioned, to start motor M. Transmission element 35 operatively connects pulley 34 with grooved wheel 160 which is supported by a thrust bearing 161 on a bracket 162. This bracket is affixed to the underface of chassis plate 31 at 163. Wheel 160 is keyed to a sleeve 164 which in turn is fixed to the hub 165 of the flywheel or turntable 42 which is rotated by motor M through the intermediary of friction wheels 166, 167, the latter engaging the inner flange 42*a* of turn table 42 (Fig. 1). Any well known spring supported tensioning means 168 may be employed to ensure frictional engagement of said wheels 166, 167 and inner flange 42*a*.

When motor M is switched into the aforesaid circuit, links 72 and 80 assume their respective positions indicated by numerals 72' and 80' as hereinabove explained, whereby pulley 34 is first coupled with cam plate 36 which carries on its surface spiral cam member 104 and selector cam 105. The forward end 170 of selector finger 43 which swings about pivot 169 on chassis plate 31 is not engaged or touched by the 10'' record disc 25 and comes into abutting position with abutment 111 of element 108, the latter being under the action of spring 108*b*.

As can be gathered from a comparison of Fig. 8 with Fig. 9, pin 107 on selector disc 106 engages the peripheral edge 105*a* of cam member 105 and gradually leads abutment piece 111 toward the forward end 170 of selector finger 43, whereupon pin 107 is disengaged from cam member 105.

During the continued rotation of cam wheel 36 coupled with pulley 34, pin 126 of the pick-up lever 121 runs off from the outer cam surface of pick-up cam 104 (Fig. 10) and is permitted to move out of groove 125 of release lever 120. However before release lever 120 becomes disengaged from pick-up lever 121, as will be described hereinafter and during the aforesaid stage of rotation lift pin 41 which actuates the pick-up arm 40 is guided from shoulder or ramp 102 of groove 101 to the deepest part thereof (Figs. 11 and 3) whereby the lift pin end 41*a* becomes disengaged from pick-up arm 40 which under the action of spring 152 leads needle 27 through slot 26 of cover plate 21 for contact with the underface of record disc 25.

Thereafter, release lever 120 is moved in lengthwise direction (away from pick-up lever 121) by release link 135, while release lever 120 is in abutting relation with 10'' record regulating pin 115. Release link 135 during this movement engages pin 132 of release lever 120 and receives its movement through the engagement of pin 134 riding on projecting cam surface 136.

As soon as pick-up lever 121 is being disengaged from release lever 120 lead spring 137 becomes effective and kicks and swings pick-up lever 121 about sleeve 116*a* in the direction of arrow F thus ensuring the engagement of needle 27 with the first groove of the record disc.

As soon as slide member 95 on cam plate 36 arrives at link 72 pin 75 thereof comes in contact with and depresses said slide member and thus causes disengagement of cam plate 36 from driven pulley 34.

Pick-up arm 40 led by the engagement of needle 27 with the record grooves is free to move together with sleeve 116 to which is fastened pick-up lever 121 as hereinabove set forth (Fig. 3).

Pick-up lever 121 moves in the direction of arrow F commensurate with the advance of needle 27 in the record disc grooves 25*a* and after about, say, half of the record disc is played causes engagement of arcuate toothed end 139 of lever extension 138 with tooth 145 of pawl 140, the latter being swingable about pivot 141.

Thus, tooth 145 engages successively the teeth of end 139 until needle 27 has completed its operation and enters the spiral center or eccentric groove of the record disc (not shown). As a consequence thereof, needle 27 performs to and fro motions which cause sleeve or bushing 116 to swing likewise back and forth and to transmit the same swinging movements to the pawl engaged toothed end 139, which assumes the position indicated by numeral 139*a* (Fig. 11).

This reciprocal swinging movement of end 139 is further communicated to pawl end 140*a*, which comes in contact with link 72 and displaces the latter (about pivot 73 and against the action of spring 74) so that it moves from position 72' to the dot and dash line position 72 (Fig. 11) in which pin 75 will be disengaged from slide member 95 of coupling device 37.

Following this disengagement of pin 75 (moved from full line position 75' to dot and dash line position) from slide member 95, pawl 92 falls into one of the recesses 91 of pulley 34 to thereby couple cam plate 36 to the latter which starts again to rotate until reset pin 100 later on abuts against arm 88 (in position indicated by numeral 88') of link 80. Displacement of arm 88 acts through pin 79 on microswitch arm 81 which opens contacts 82, 83 of the motor circuit, as hereinabove set forth.

Prior to the action of reset pin 100 the following motions take place (while cam plate 36 and pulley 34 rotate together):

(1) Lift pin 41 is immediately moved out of groove 101 and engages the top surface 93a of cam plate 36 whereby the upper end 41a of pin 41 presses against pick-up arm 40 to swing the latter about pivot 150 in the direction of arrow G so that needle 27 is withdrawn from the eccentric groove of the record disc 25.

(2) Needle 27 is guided out of slot 26 back to its starting position on account of the return of pick-up lever 121 to its engagement position with release lever 120.

To this end, during the rotative stage of cam plate 36 cam member 104 comes to engage pin 126 of lever 121 which is gradually led or swung back to starting position (Fig. 8). During this swinging movement disengagement of pawl tooth 145 from toothed extension end 139 takes place since the latter moves in a direction opposite to that of arrow F. Pin 126 engages in this starting position against notch 125 of release lever 120.

(3) As soon as pin 134 of release link 135 encounters again lower part 136a of cam plate 136 release lever 120 moves in lengthwise direction toward pick-up lever 121 and permits engagement of pin 126 (still guided by cam member 104) with notch 125, as will be well understood (Fig. 8).

(4) Forward end 170 of selector finger 43 becomes disengaged from abutment edge 111, since pin 107 of selector disc 106 comes in contact with the highest point of cam surface 105a of selector cam 105 (Fig. 8).

It will be observed that when reset pin 100, as above stated, opens the motor circuit passing through conductors 54, 54a, record disc 25 may still rest on center pin 24. However, in order that link 80 together with arm 88 and pin 78 may be displaced about pivot 77 from dot and dash line position 80′ to the full line position, pin 78 has to overcome abutment or nose 86 of push bar 70, which is still in its extended position (indicated by arrow B).

This is achieved by the fact that pin 78 (during the displacement of link 80 from position 80′ to full line position) forces light spring 87 to give sidewardly and enters recess 85.

Only after record disc 25 has been finally removed from center pin 24 will an electric circuit be established which includes again contact shoes 49 and 51, the latter contact leading to conductor 55a and closed contacts 57a, 57 (which are still engaged due to the magnetic retentiveness of the core of relay 59) to thereby produce in said relay 59 through coil 58 a reversal of the current flow which de-magnetizes said relay 59. Return of armature 53 through spring action 63 and of link bar 65 and push bar 70 (the latter moved in the direction of arrow $B_1$) to respective initial position is thus achieved (Fig. 5) as above explained.

It is obvious that return movement of push bar 70 in the direction of arrow $B_1$ permits push pin 78 to move relatively to said push bar 70 and out of recess 85 past spring 87 so as to assume again its initial and abutting position in front of nose or projection 86, as seen in Fig. 5.

From the above description it will become apparent that all movable parts of the apparatus are now reset to starting positions.

If it will be desired to employ the apparatus 20 for playing a 12″ recording disc 25b the latter is brought into engagement with center pin 24 for contact with abutment ring 24a thereof. As a consequence thereof selector finger 43 whose tip is in the path of and touched by disc 25b, is displaced and swung (against light spring 43c) to a position 43a within slot 43b which is provided in cover plate 21 (Fig. 1). Selector finger 43, as hereinabove stated, is swingably supported by pivot 169 on chassis plate 31 and will permit in its position 43a that forward end 170 clears abutment edge 111 since end 170 is lifted to the dot and dash line position as seen in Fig. 1.

As soon as recording disc 25b engages center pin 24 and is placed on platform 23 the aforesaid electric circuit (see Fig. 5) is actuated to start motor M for driving pulley 34 and to bring about coupling of the latter with cam plate 36.

As hereinabove stated, due to the movement of cam plate 36 cam 105 (Figs. 7 and 8) is rotated and engages pin 107 of selector disc 106 at its largest radius whereby, in the present instance, and in contradistinction to the above explained condition with respect to a 10″ record disc the forward end 170 of selector finger 43 is lifted to the surface of the V-shaped element 108, clears abutment 111 (during the further relative movement between pin 107 and cam surface 105a) and thus causes disengagement of the tip of selector finger 43 (in position 43a) from the underface of record disc 25b. Pin 107 becomes subsequently disengaged from said cam surface 105a (Figs. 8 and 9).

Thus, selector disc 106 is permitted to rotate about pivot 108a under the action of spring 108b until screw bolt or stop 109 comes to abut against the end of slot 110 (Fig. 1), thus bringing automatically 12″ record regulating pin 112 into engagement with release lever 120.

During the still continued rotation of cam plate or wheel 36 pin 126 of pick-up lever 121 disengages pick-up cam 104 (as set forth in connection with the playing of 10″ recording disc) and disengagement of pick-up lever 121 from release lever 120 takes place, the latter being then in contact with pin 112.

Operation and function of the apparatus are otherwise the same as elucidated with respect to the playing of 10″ recordings.

If it should become necessary and as it is desirable for phonograph record demonstration in stores and other establishments where record discs are tried out provision has been made according to this invention to preset the extent of the record disc to be played, namely, to ¼, ½ or ¾ of the full recording. To this end, the adjustable heel or abutment means 128 pivoted at 127 will be manually operated or swung (by means of handle 129 along markings 131) to an advanced position indicated by numeral 128′ and is caused to actuate link 72′ before toothed periphery 139 will be rocked and moved to and fro due to the engagement of the needle 27 with the eccentric end groove (not shown) of the recording disc.

Otherwise, the successive steps in the operation of the apparatus remain the same, whereby cam plate 36 will be coupled to move again together with pulley 34 for resetting the apparatus.

For sake of clarity it is to be noted that pins, such as 73, 77, 124a, 133 etc. forming either pivots or anchoring means for springs, such as 63, 68, 74, 84, 123, 142 etc. are fixed to the chassis plate 31 in any appropriate manner and are indicated more diagrammatically in the drawings.

It is well obvious that the center pin arrangement, the control means for the tone arm, the selector means for various diameters of record discs, adjustable means for regulating and presetting the extent of the record disc to be played may be likewise applied to phonograph apparatus equipped with a tone arm for playing the top or upper surface of the recording.

As will be realized from the above disclosure of the operation of the apparatus, cam plate 36 will always complete a single revolution regardless whether the recording disc has been played to the full extent or to a portion of the recording grooves, while the pulley is operatively connected to the motor drive and performs a number of revolutions.

The various features of the invention may be employed either singly or in combination and the various structural elements may vary in size, shape, form and relative arrangement. The apparatus herein disclosed is of practical construction, reliable, rigid and efficient in use and operation and adapted to accomplish among others, all of the objects and advantages herein set forth.

Having thus described the invention, what is claimed as new and desired to be secured by Letters Patent, is:

1. In a tone reproducing apparatus having a cover plate, a chassis plate below said cover plate, a tone arm supported by said chassis plate and adapted to carry an element for engagement with the recording grooves of a disc, a motor, a platform for said disc and rotatable within an opening of said cover plate, and transmission means connected to said motor for operating said platform; a pulley journalled on said chassis plate, and in driving connection with said motor, a plurality of cam means positioned above said pulley, means carried by and adapted to couple said cam means with said pulley and for release therefrom, a pick-up lever controllable by one of said cam means and connected to said tone arm, whereby said pick-up lever is moved from starting position to a predetermined position in which said tone arm element is disengaged from said recording grooves, a pawl member pivoted to said chassis plate, toothed means carried by said pick-up lever and cooperable with said pawl member in said predetermined position of said pick-up lever, said pawl member being actuable by said pick-up lever in said predetermined position and being operatively connected with said coupling means to cause engagement of said cam means with said pulley whereby said pick-up lever is moved by said cam means to starting position, and a lift pin passing through said pick-up lever, said lift pin being controllable by another of said cam means and being engageable with said tone arm, whereby the latter is moved by said pick-up lever in one direction and by said lift pin in a direction perpendicular to said one direction, said cover plate being provided with a passage for said tone arm element when moved toward and from said recording disc in accordance with movements of said tone arm.

2. In an apparatus according to claim 1, including selector means journalled on said chassis plate, said selector means comprising a selector finger, and a selector disc provided with stop means and adapted to cooperate with said selector finger, said selector finger extending above said cover plate for contact with a recording disc of predetermined diameter whereby the position of said stop means of said selector disc will be changed, and release means regulating the starting position of said pick-up lever and engageable with said stop means when said predetermined recording disc is employed.

3. In an apparatus according to claim 1, including a center pin engageable with said disc and passing through said platform, and switch means including an electric circuit, said switch means being arranged below said platform and cooperating with said center pin to regulate supply of electric current to said motor.

4. In a tone reproducing apparatus for recordings; an electric power source including electric circuit means, a rotatable platform for supporting a recording disc, said platform being operatively connected to said power source to be set in rotation by the latter, a displaceable center pin engageable with and facilitating guidance of said recording disc onto and from said platform, switch means actuatable upon displacement of said center pin to close said circuit means, a tone arm having a starting position and including an element adapted to cooperate with said recording disc, control means for regulating movements of said tone arm and operatively connected for movement to said platform, manually operable means operatively connected to said tone arm and adapted to cooperate with said control means to thereby cause reset of said tone arm to starting position after the latter has reached a predetermined position beyond said starting position, and means forming part of said tone arm control means and actuating through the latter said switch means to thereby open in said starting position said circuit means and to disconnect said power source therefrom.

5. In a tone reproducing apparatus for recordings according to claim 4, wherein said manually operable means is in the form of a swingable lever, said tone arm including a pick-up lever, said swingable lever being adjustably and pivotally attached to said pick-up lever and movable relatively to the latter, said swingable lever being adapted to actuate said control means in said predetermined position of said tone arm.

6. In a tone reproducing apparatus for recording disks; the combination of a power driven platform for supporting a recording disk, with electric switch means including an electric circuit and adapted to operate the power drive of said platform, a tone arm including a holder for a needle for engaging said recording disk, movably arranged mechanical control means for regulating movements of said tone arm relative to said recording disk, adjusting means extending from said control means and for abutment against a portion of said switch means to open said circuit, whereby the movement of said tone arm is defined with respect to a predetermined part of said recording disk, and a center pin passing through said platform and arranged for displacement with respect to the latter upon engagement with said rocording disk whereby said center pin abuts against another portion of said switch means to close said circuit.

7. In a tone reproducing apparatus according to claim 6, wherein said control means includes a pick-up lever which is operatively connected to said tone arm, said pick-up lever pivotally supporting said adjusting means.

8. In a tone reproducing apparatus according to claim 6, wherein a pulley is arranged for moving said control means which is coaxially arranged on said pulley, transmission means for transmitting movement from said platform to said pulley, and coupling means arranged intermediate said control means and said pulley to regulate the movement of said control means with respect to said pulley.

ALEXANDER LISSIANSKY.

REFERENCES CITED

The following references are of record in the file of this patent:

UNITED STATES PATENTS

| Number | Name | Date |
|---|---|---|
| 1,069,784 | Hodges | Aug. 12, 1913 |
| 1,429,839 | Boswell | Sept. 19, 1922 |
| 1,436,129 | Watson | Nov. 21, 1922 |
| 1,568,130 | Blackwell | June 5, 1926 |
| 2,113,401 | Goldsmith | Apr. 5, 1938 |
| 2,230,106 | Erwood | Jan. 28, 1941 |
| 2,300,149 | Guedon | Oct. 27, 1942 |
| 2,323,472 | Johnson et al. | July 6, 1943 |
| 2,366,858 | Knox et al. | Jan. 9, 1945 |

FOREIGN PATENTS

| Number | Country | Date |
|---|---|---|
| 382,276 | Great Britain | Oct. 17, 1932 |